United States Patent
Jung et al.

(10) Patent No.: US 12,250,652 B2
(45) Date of Patent: Mar. 11, 2025

(54) CHANNEL RASTER FOR NR V2X

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

(21) Appl. No.: 17/764,014

(22) PCT Filed: Sep. 25, 2020

(86) PCT No.: PCT/KR2020/013067
§ 371 (c)(1),
(2) Date: Mar. 25, 2022

(87) PCT Pub. No.: WO2021/066403
PCT Pub. Date: Apr. 8, 2021

(65) Prior Publication Data
US 2022/0417884 A1     Dec. 29, 2022

(30) Foreign Application Priority Data
Oct. 3, 2019 (KR) .................. 10-2019-0122720

(51) Int. Cl.
*H04W 56/00* (2009.01)
*H04W 92/18* (2009.01)

(52) U.S. Cl.
CPC ..... *H04W 56/0035* (2013.01); *H04W 56/001* (2013.01); *H04W 92/18* (2013.01)

(58) Field of Classification Search
CPC .......... H04W 56/0035; H04W 56/001; H04W 92/18; H04W 84/005; H04W 4/40; H04W 72/04; H04W 72/0453; H04W 72/20
USPC ....................................................... 370/503
See application file for complete search history.

(56) References Cited

U.S. PATENT DOCUMENTS

2019/0253908 A1*  8/2019  Fan .................. H04W 24/08

FOREIGN PATENT DOCUMENTS

KR     1020190029617      3/2019

OTHER PUBLICATIONS

Vivo (R4-1908423, "Discussion on system parameters for NR V2X band n47", Aug. 26-30, 2019) (Year: 2019).*
Samsung, Ericsson, KDDI (R4-1907805, CR to TS38.104 to introducing spectrum sharing on band n41, Mar. 29, 2019) (Year: 2019).*
(Continued)

*Primary Examiner* — Maharishi V Khirodhar
(74) *Attorney, Agent, or Firm* — BRYAN CAVE LEIGHTON PAISNER LLP

(57) ABSTRACT

One embodiment disclosed in the present specification provides a method for a vehicle to everything (V2X) communication, comprising: determining position of at least one frequency for at least one synchronization signal block (SSB), wherein the position of the at least one frequency is determined based on a channel raster for new radio (NR) V2X, wherein the channel raster for the NR V2X is determined based on a first frequency shift of −5 kHz or 5 kHz.

15 Claims, 17 Drawing Sheets

(56) References Cited

OTHER PUBLICATIONS

Samsung (R4-1905465, CR to TS38. 101-1 to introducing spectrum sharing on band n41 , Mar. 29, 2019) (Year: 2019).*
Vivo, Discussion on system parameters for NR V2X band n47, R4-1908423, 3GPP TSG-RAN WG4 Meeting #92, Ljubljana, SI, Aug. 16, 2019, see sections 2.1-2.3.
3GPP; TSG RAN; NR; UE radio transmission and reception; Part 3; Range 1 and Range 2 Interworking operation with other radios (Release 15), 3GPP TS 38.101-3 V15.6.0, Jul. 14, 2019, see section 5.4B.1.
3GPP; TSG RAN; NR; RRC protocol specification (Release 15), 3GPP TS 38.331 V15.7.0, Sep. 27, 2019, see section 6.3.2.
Qualcomm Inc., On Band Definition of NR V2X, R4-1906943, 3GPP TSG-RAN WG4 Meeting #91, May 3, 2019, see section 2.

* cited by examiner

CHANNEL RASTER FOR NR V2X

This application is the National Stage filing under 35 U.S.C. 371 of International Application No. PCT/KR2020/013067 filed on Sep. 25, 2020, which claims priority to Korean Patent Application No. 10-2019-0122720 filed on Oct. 3, 2019, the contents of which are all hereby incorporated by reference herein in their entirety.

TECHNICAL FIELD

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

When the E-UTRA operating band 47 used for LTE-based V2X communication is to be converted and used for NR-based V2X (called band n47), the specific channel arrangement has not been studied yet, so there was a problem that it was difficult to implement.

SUMMARY

Therefore, the disclosure of the present specification is to propose method for solving the above-mentioned problems.

For solving the above-mentioned problems, the disclosure of the present specification is to propose a method for a vehicle to everything (V2X) communication. The method may comprise: determining position of at least one frequency for at least one synchronization signal block (SSB), wherein position of the at least one frequency may be determined based on a channel raster for new radio (NR) V2X, wherein the channel raster for the NR V2X may be determined based on a first frequency shift of −5 kHz or 5 kHz.

For solving the above-mentioned problems, the disclosure of the present specification is to propose a V2X (VEHICLE-TO-EVERYTHIHG) communication device, comprising: at least one processor; and at least one memory for storing instructions and operably electrically connectable with the at least one processor, wherein, based on being executed by the at least one processor, the instructions perform operation comprising: determining position of at least one frequency for at least one synchronization signal block (SSB), wherein the position of the at least one frequency may be determined based on a channel raster for new radio (NR) V2X, wherein the channel raster for the NR V2X may be determined based on a first frequency shift of −5 kHz or 5 kHz.

For solving the above-mentioned problems, the disclosure of the present specification is to propose a chipset installed in a V2X (vehicle to everything) communication device, comprising: at least one processor; at least one memory for storing instructions and operably electrically connectable with the at least one processor, wherein the instructions, based on being executed by the at least one processor, perform operation comprising: determining position of at least one frequency for at least one synchronization signal block (SSB), wherein the position of the at least one frequency may be determined based on a channel raster for new radio (NR) V2X, wherein the channel raster for the NR V2X may be determined based on a first frequency shift of −5 kHz or 5 kHz.

For solving the above-mentioned problems, the disclosure of the present specification is to propose a non-volatile computer-readable storage medium having recorded thereon instructions, wherein the instructions, when executed by one or more processors mounted on a vehicle to everything (V2X) communication device, cause the one or more processors to perform an operation, comprising: determining position of at least one frequency for at least one synchronization signal block (SSB), wherein the position of the at least one frequency may be determined based on a channel raster for new radio (NR) V2X, wherein the channel raster for the NR V2X may be determined based on a first frequency shift of −5 kHz or 5 kHz.

For solving the above-mentioned problems, the disclosure of the present specification is to propose a method for a vehicle to everything (V2X) communication, performed by a base station, comprising: determining position of at least one frequency for at least one synchronization signal block (SSB), wherein the position of the at least one frequency may be determined based on a channel raster for new radio (NR) V2X, wherein the channel raster for the NR V2X may be determined based on a first frequency shift of −5 kHz or 5 kHz.

For solving the above-mentioned problems, the disclosure of the present specification is to propose a base station for vehicle to everything (V2X) communication, comprising: at least one processor; and at least one memory for storing instructions and operably electrically connectable with the at least one processor, wherein the instructions, based on being executed by the at least one processor, perform operation comprising: determining position of at least one frequency for at least one synchronization signal block (SSB), wherein the position of the at least one frequency may be determined based on a channel raster for new radio (NR) V2X, wherein the channel raster for the NR V2X may be determined based on a first frequency shift of −5 kHz or 5 kHz.

Therefore, the disclosure of the present specification is to propose method for solving the above-mentioned problems.

DETAILED DESCRIPTION

Figure 1:
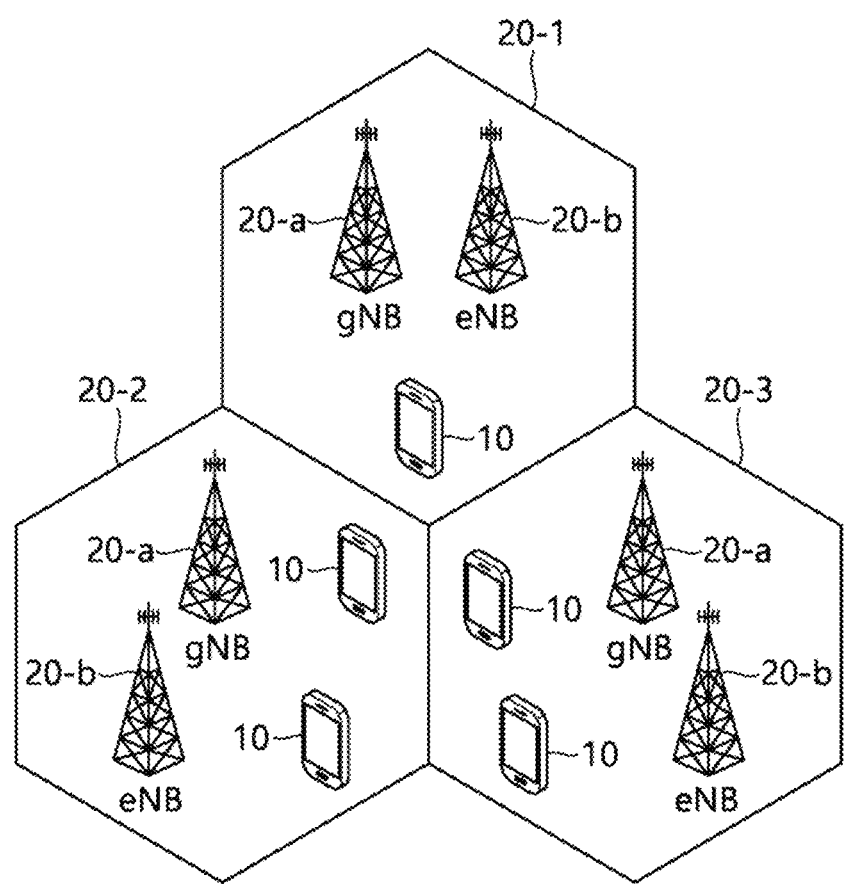
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (eg, a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a wireless communication system.

As can be seen with reference to FIG. 1, a wireless communication system includes at least one base station (BS). The BS is divided into a gNodeB (or gNB) 20a and an eNodeB (or eNB) 20b. The gNB 20a supports 5G mobile communication. The eNB 20b supports 4G mobile communication, that is, long term evolution (LTE).

Each base station 20a and 20b provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
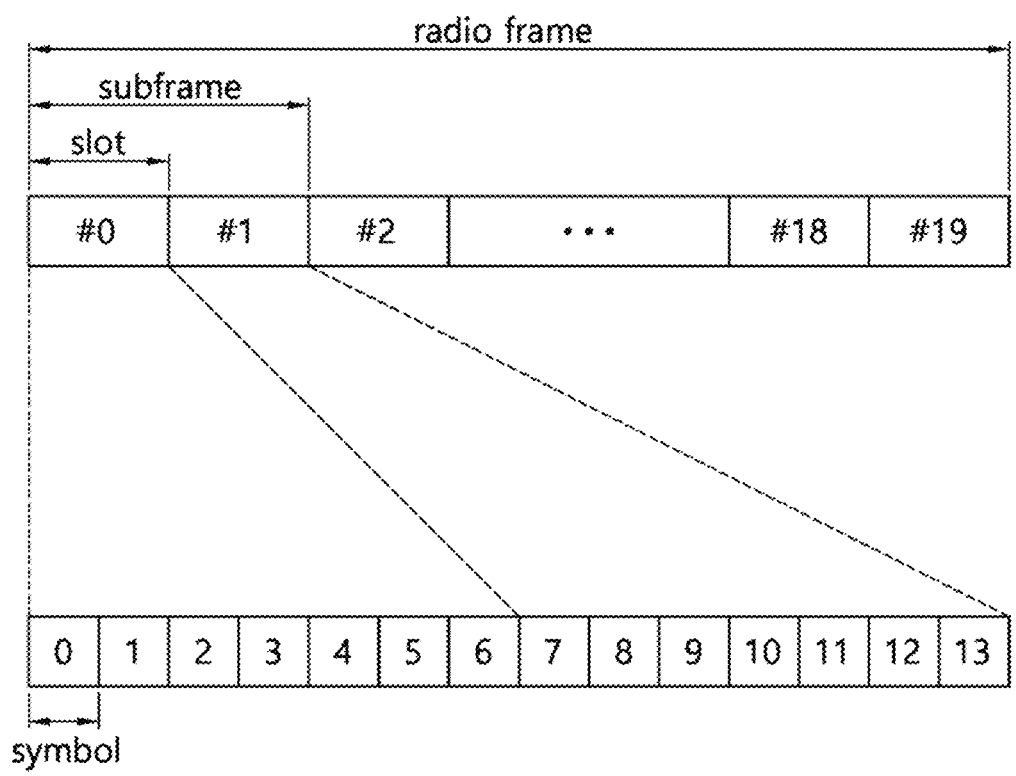
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

be used for a variety of purposes, for example for communication for vehicles (e.g., autonomous driving).

The operating band of below Table 2 is an operating band defined in FR1 including a band newly defined for NR and an operating band converted from the operating band of LTE/LTE-A.

TABLE 2

| NR operation bands | Uplink operation bands $F_{UL\_low}$-$F_{UL\_high}$ | Downlink operation bands $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 Mhz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may The table below shows the NR operating bands defined on the high frequency phase. This is called the FR2 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
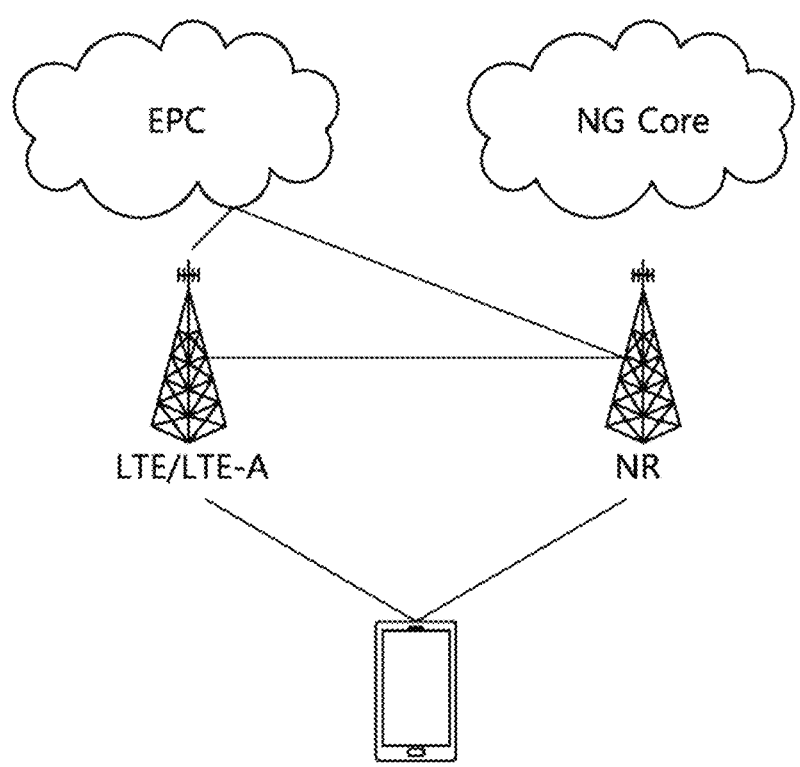
FIGS. 3a to 3c are exemplary diagrams illustrating an exemplary architecture for a service of next-generation mobile communication.
Figure 3B:
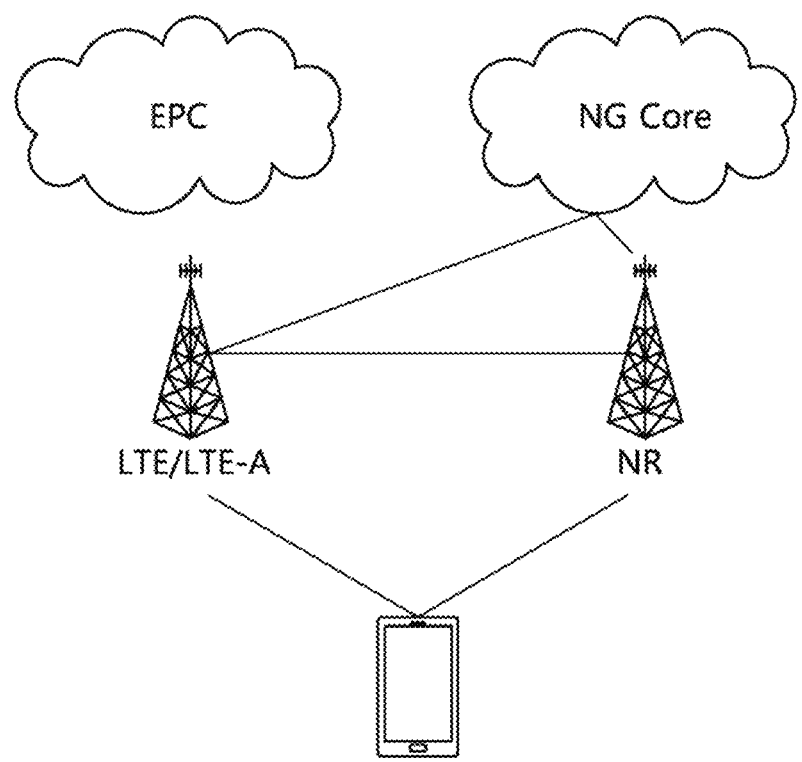
Figure 3C:
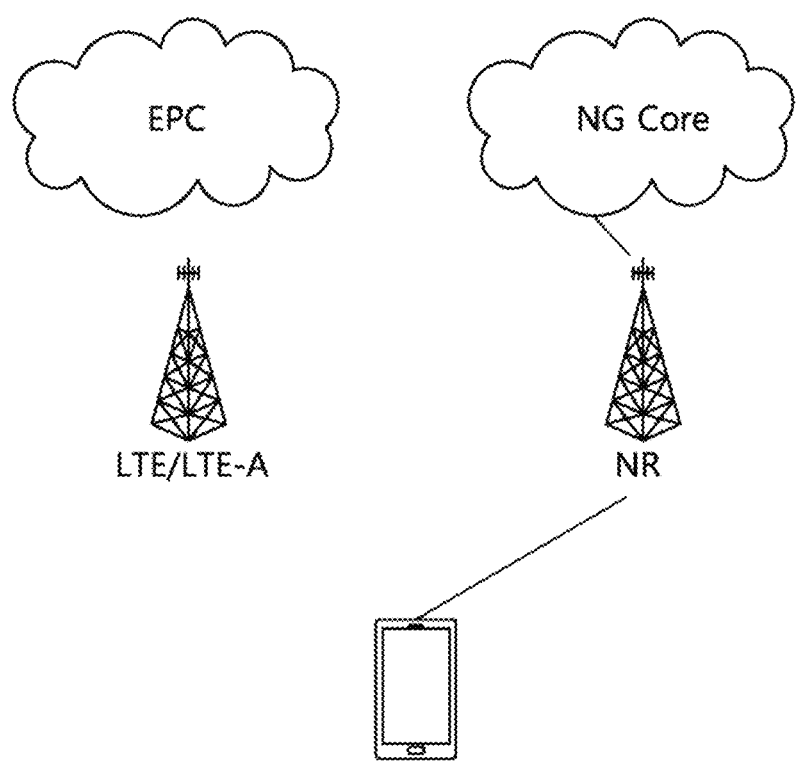

FIGS. 3a to 3c are exemplary diagrams illustrating an exemplary architecture for a service of next-generation mobile communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA (non-standalone).

Referring to FIG. 3c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
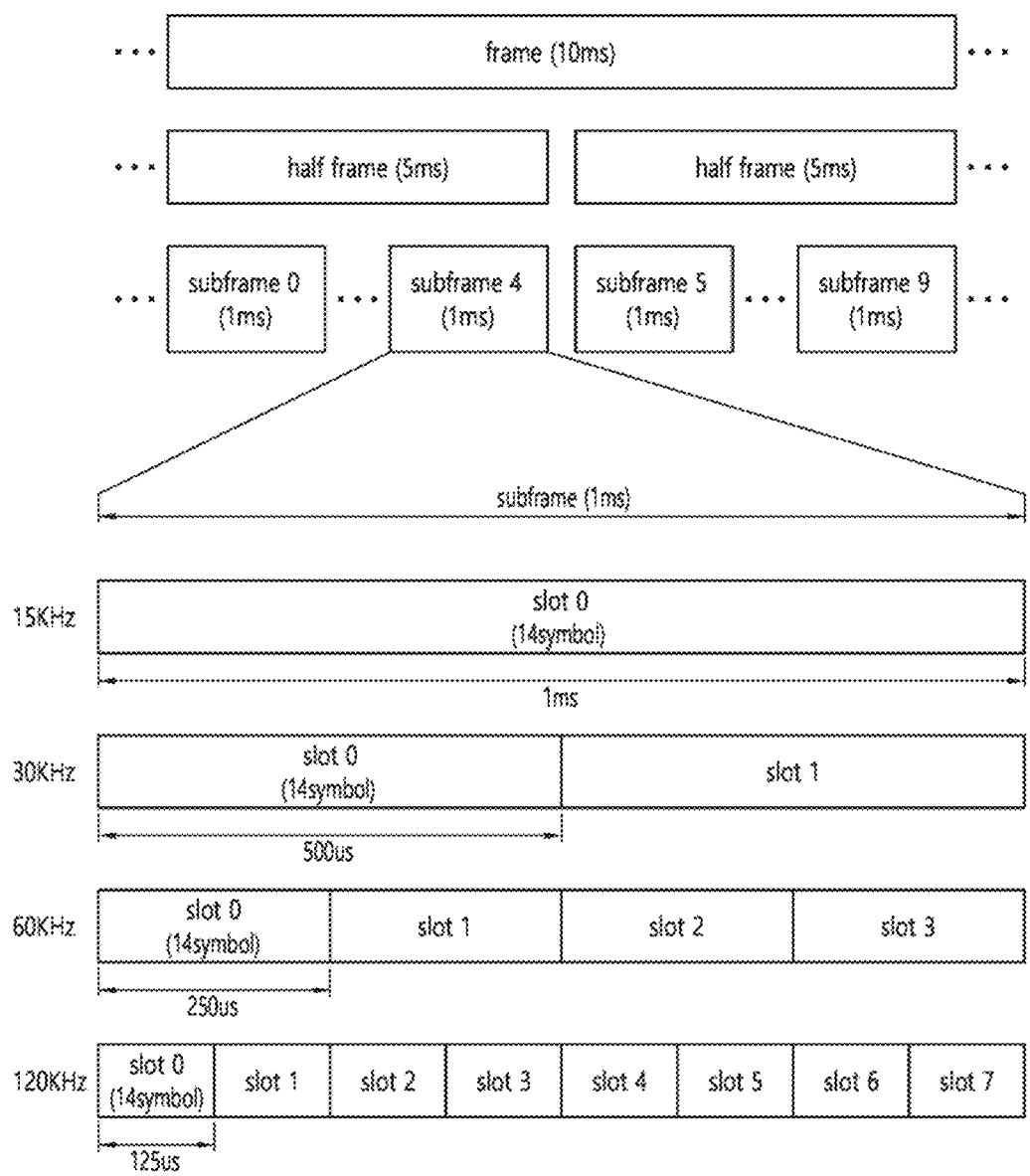
FIG. 4 illustrates structure of a radio frame used in NR.

FIG. 4 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
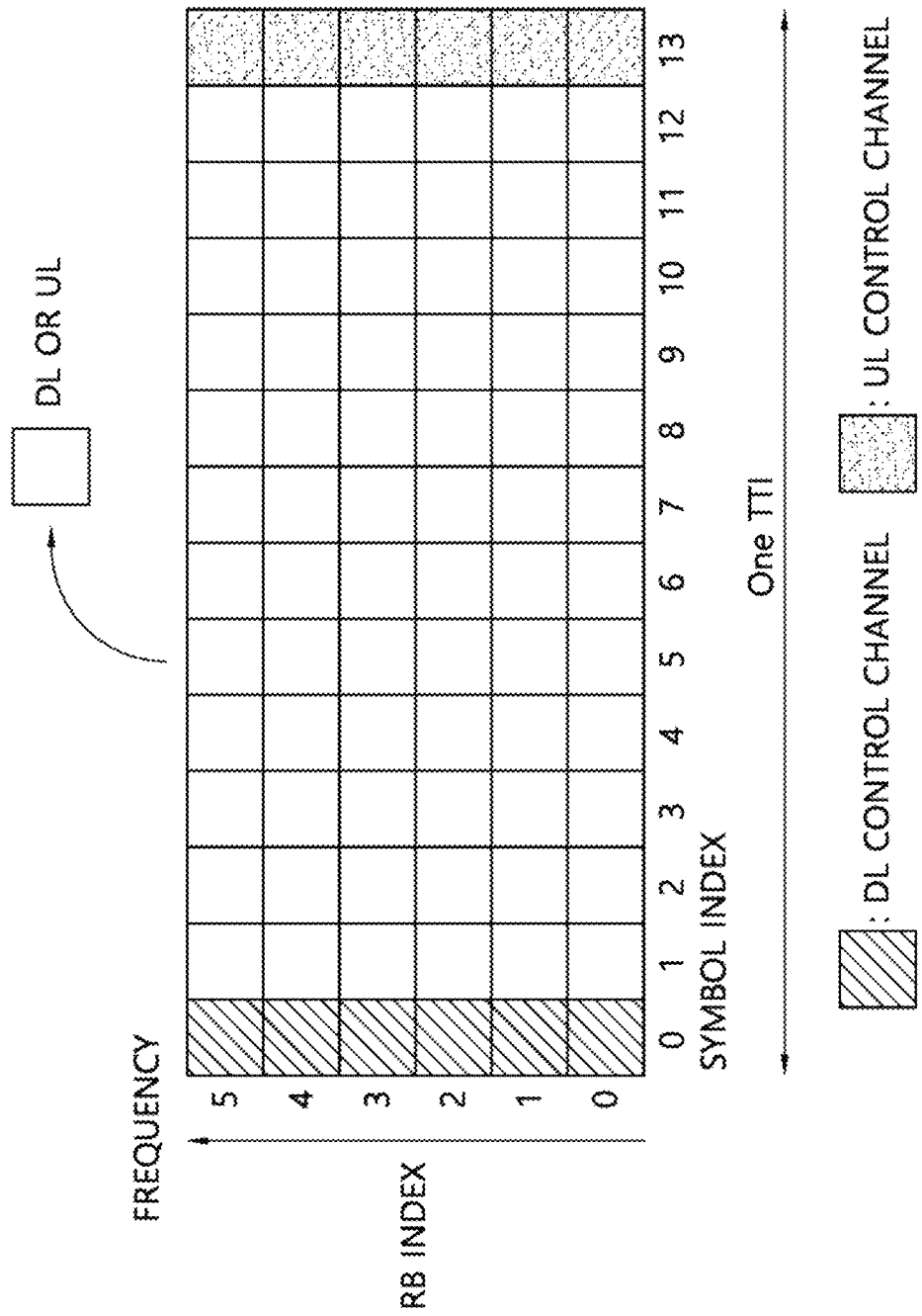
FIG. 5 shows an example of subframe types in NR.

FIG. 5 shows an example of subframe types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 4

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot Nslotsymb, the number of slots per frame Nframe,μslot, and the number of slots per subframe Nsubframe,μslot are expressed as shown in the following table.

TABLE 5

| $\mu$ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot Nslotsymb, the number of slots per frame Nframe,μslot, and the number of slots per subframe Nsubframe,μslot are expressed as shown in the following table.

TABLE 6

| M | $N^{slot}_{symb}$ | $N^{frame, \mu}_{slot}$ | $N^{subframe, \mu}_{slot}$ |
|---|---|---|---|
| 2 | 12 | 40 | 4 |

<Bandwidth Part: BWP>

In NR, broadband frequencies up to 400 MHz can be used. In order to allow various UEs to efficiently allocate and use frequency resources, NR introduces a new concept called BWP.

When the UEs perform initial access and transmit information about the capability of the UE to the base station, the base station sets the BWP to be used by the UE for each UE based on this information, and may transmit information on the BWP set to each UE. Then, downlink and uplink data transmission/reception between each UE and the base station is performed only through the BWP configured for each UE. That is, when the base station sets the BWP to the UE, the UE instructs not to use a frequency band other than the BWP when performing wireless communication with the base station thereafter.

The base station may set the entire band of the carrier frequency up to 400 MHz as the BWP for the UE, and may set only some bands as the BWP for the UE. In addition, the base station may configure multiple BWPs for one UE. When multiple BWPs are configured for one UE, the frequency bands of each BWP may or may not overlap each other.

<NR in SS Block>

In 5G NR, information necessary for a UE to perform initial access, that is, a physical broadcast channel (PBCH) including a master information block (MIB) and a synchronization signal (SS) (including PSS and SSS) are defined as an SS block (SSB). do. In addition, a plurality of SS blocks may be bundled to define an SS burst, and a plurality of SS bursts may be bundled to define an SS burst set. It is assumed that each SS block is beamformed in a specific direction, and several SS blocks in the SS burst set are designed to support terminals existing in different directions, respectively.

Figure 6:
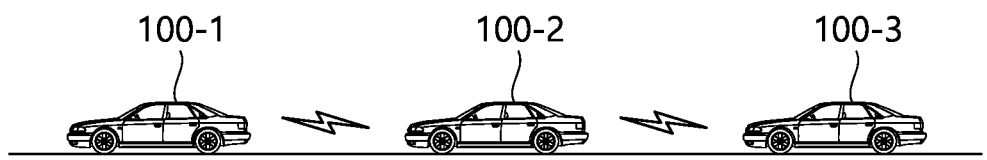
FIG. 6 is an exemplary diagram illustrating an example of an SS block in NR.

FIG. 6 is an exemplary diagram illustrating an example of an SS block in NR.

Referring to FIG. 6, the SS burst is transmitted every predetermined period. Accordingly, the terminal receives the SS block, and performs cell detection and measurement.

Meanwhile, in 5G NR, beam sweeping is performed for SS. This will be described with reference to FIG. 7.

Figure 7:
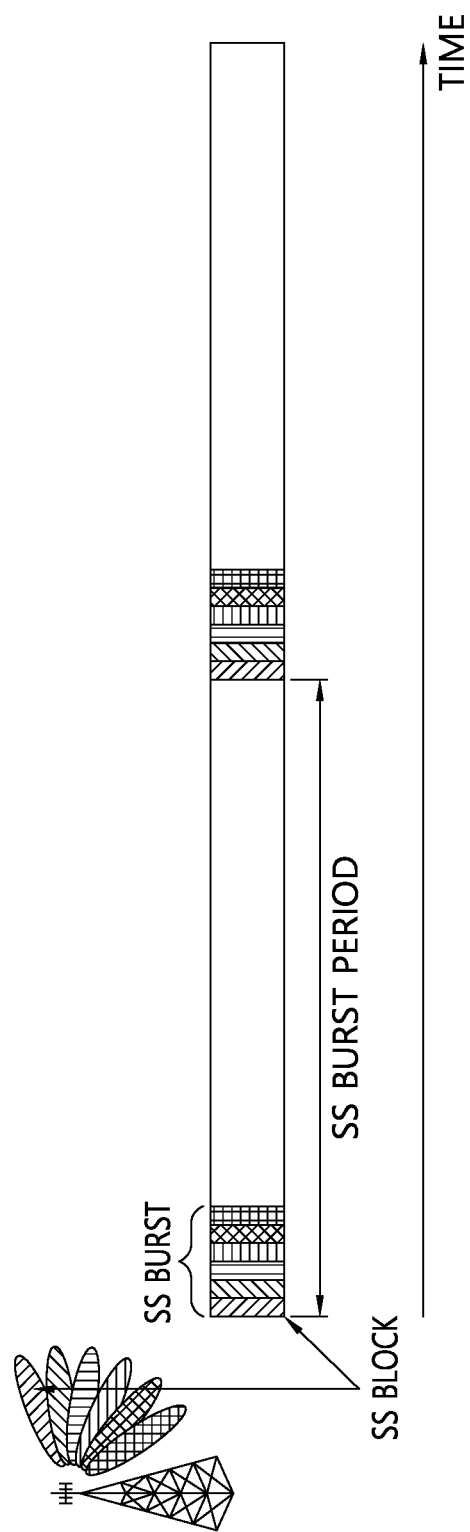
FIG. 7 is an exemplary diagram illustrating an example of beam sweeping in NR.

FIG. 7 is an exemplary diagram illustrating an example of beam sweeping in NR.

The base station transmits each SS block in the SS burst while performing beam sweeping according to time. In this case, several SS blocks in the SS burst set are transmitted to support terminals existing in different directions, respectively. In FIG. 6, the SS burst set includes SS blocks 1 to 6, and each SS burst includes two SS blocks.

<Channel Raster and Sync Raster>

Hereinafter, a channel raster and a sync raster will be described.

A frequency channel raster is defined as a set of RF reference frequencies (FREF). The RF reference frequency may be used as a signal to indicate a location of an RF channel, SS block, or the like.

A global frequency raster is defined for all frequencies from 0 to 100 GHz. The unit of global frequency raster is represented by $\Delta F_{Global}$.

The RF reference frequency is specified by an NR Absolute Radio Frequency Channel Number (NR-ARFCN) in the range (0 . . . 2016666) of the global frequency raster. The relationship between NR-ARFCN and the RF reference frequency (FREF) of MHz can be expressed by the following equation. Here, FREF-Offs and $N_{Ref\text{-}Offs}$ are as follows.

$$F_{REF} = F_{REF\text{-}Offs} + \Delta F_{Global}(N_{REF} - N_{REF\text{-}offs}) \qquad \text{[Equation 1]}$$

TABLE 7

| Frequency range (MHz) | $\Delta F_{Global}$ (kHz) | FREF-Offs (MHz) | NREF-Offs | Scope of NREF |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster represents a subset of RF reference frequencies that can be used to identify RF channel positions in uplink and downlink. An RF reference frequency for an RF channel may be mapped to a resource element on a carrier wave.

The mapping between the RF reference frequency of the channel raster and the corresponding resource element can be used to identify the RF channel location. The mapping depends on the total number of RBs allocated to the channel and applies to both UL and DL.

If NRB mod 2=0,
RE index k is 0,
The number of PRBs is as follows.

$$n_{PRB} = \left\lfloor \frac{N_{RB}}{2} \right\rfloor$$

If NRB mod 2=1,
RE index k is 6,
The number of PRBs is as follows.

$$n_{PRB} = \left\lfloor \frac{N_{RB}}{2} \right\rfloor$$

The RF channel position of the channel raster on each NR operating band may be represented as shown in the table below.

TABLE 8

| NR operation band | $\Delta F_{Raster}$ (kHz) | Uplink frequency range of $N_{REF}$ (First-<Step size>-Last) | downlink frequency range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |

TABLE 8-continued

| NR operation band | $\Delta F_{Raster}$ (kHz) | Uplink frequency range of $N_{REF}$ (First-<Step size>-Last) | downlink frequency range of $N_{REF}$ (First-<Step size>-Last) |
|---|---|---|---|
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 9

| NR operation band | $\Delta F_{Raster}$ (kHz) | Uplink downlink frequency range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

On the other hand, the sync raster indicates the frequency location of the SS block used by the UE to obtain system information. The frequency location of the SS block may be defined as $SS_{REF}$ using the corresponding GSCN number.

<V2X (Vehicle-to-Everything)>

V2X (vehicle-to-everything) refers to communication technology through all interfaces with the vehicle. The implementation form of V2X may be as follows.

In V2X, 'X' may mean a person or a pedestrian. In this case, V2X may be displayed as V2P (vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (RSU) or a vehicle and a network. The roadside device may be a device that informs traffic-related infrastructure, for example, a speed. The roadside device may be implemented in a base station or a fixed terminal.

Alternatively, 'X' in V2X may be a vehicle. In this case, V2X may be expressed as V2V (vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in sidelink.

Demodulation Reference signal (DMRS)
Sidelink Synchronization signal (SLSS)

The SLSS includes a primary sidelink synchronization signal (PSLSS) and a secondary sidelink synchronization signal (Secondary SLSS: SSLSS).

Sidelink is also called PC5. On the other hand, the link between the base station and the V2X device is called a Uu link.

Figure 8:
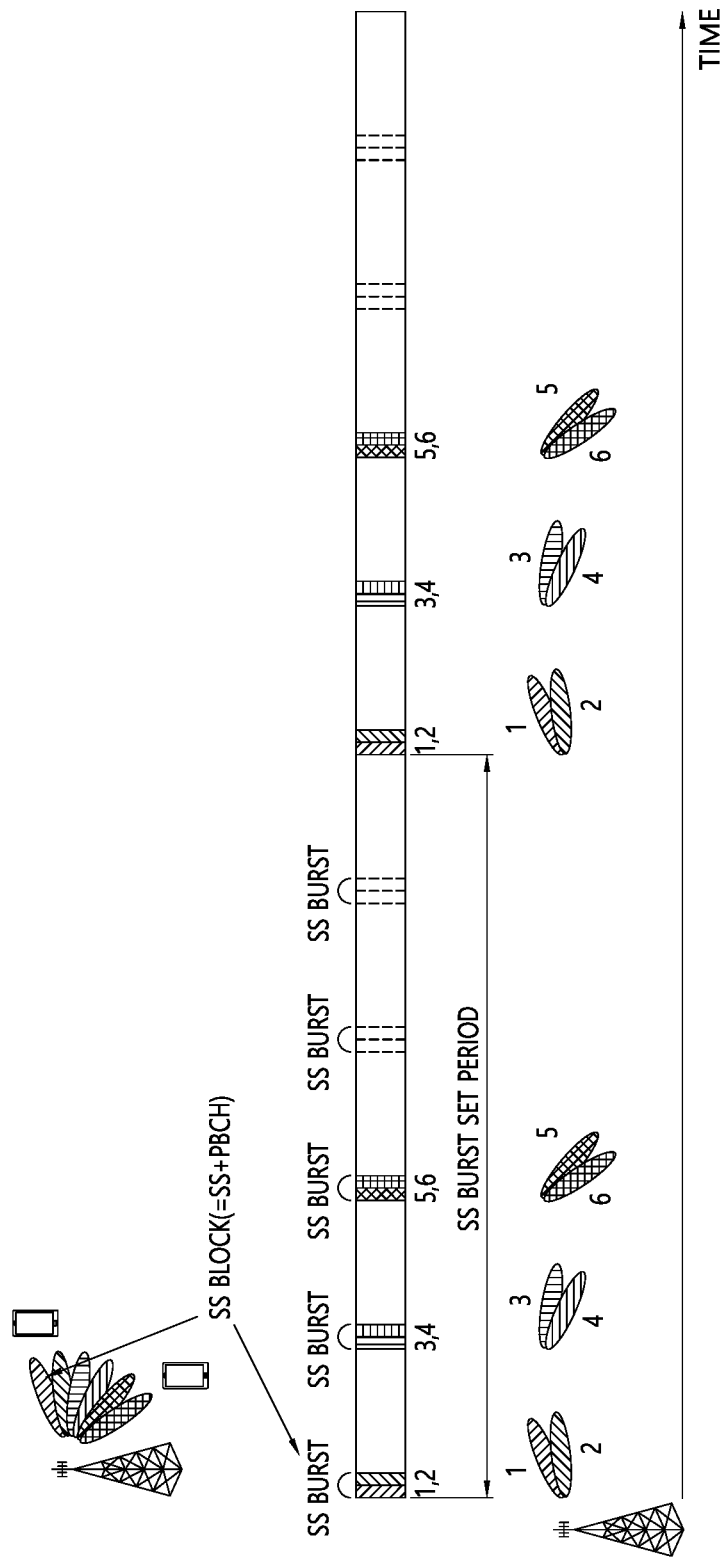
FIG. 8 is an exemplary diagram illustrating the concept of V2X.

FIG. 8 is an exemplary diagram illustrating the concept of V2X.

As can be seen with reference to FIG. 6, the wireless devices (ie, V2X devices) (100-1, 100-2, 100-3) mounted on the vehicle may communicate with each other.

The sidelink used for V2X communication may be LTE-based or NR-based.

In case of LTE-based, the sidelink used for V2X communication may use E-UTRA operation band 47 as follows.

TABLE 10

| E-UTRA V2X operation band | V2X UE transmission $F_{UL\_low}$-$F_{UL\_high}$ | V2X UE reception $F_{DL\_low}$-$F_{DL\_high}$ | Duplex mode | Interface |
|---|---|---|---|---|
| 47 | 5855 MHz-5925 MHz | 5855 MHz-5925 MHz | HD | PC5 |

Problems to be Solved by the Disclosure of this Specification

When the E-UTRA operating band 47 used for LTE-based V2X communication is to be refarmed to use for NR-based V2X (referred to as band n47), the specific channel arrangement has not been studied yet, so there was a problem that it was difficult to implement.

Disclosures of the Present Specification

Therefore, the disclosure of the present specification aims to present various matters including channel arrangement when the band n47 is to be used for V2X communication.

First, a general view of channel arrangement will be described.

In NR, the channel raster (ie, NR-ARFCN) and the sync raster (ie, GSCN) are used differently in consideration of wideband operation. On the other hand, in LTE, one channel raster (ie, EARFCN) was integrated and used.

In NR V2X, in order to prevent a V2X device from performing a blind search for an SL-SSB (sidelink SSB), the network should set the exact location of the SL-SSB. Considering that the increment size of the GSCN is 1.2 MHz for the range of 0-3000 MHz and 1.44 MHz for the range of 3000-24250 MHz, the GSCN for specifying the exact frequency of the SL-SSB cannot help having some limitations in point of view of flexibility of the SL-SSB location. Therefore, an exact definition of GSCN may not be necessary.

Proposal 1. This specification does not define GSCN requirements in NR V2X.

For the channel raster of NR V2X, the existing NR-ARFCN channel raster may be reused for a license band. Therefore, it can be proposed as follows.

Proposal 2. This specification proposes to use NR-ARFCN of Uu link for NR V2X licensed band operation.

In addition, considering the difference in waveform between LTE uplink/sidelink (SC-FDMA with 7.5 kHz shift) and NR sidelink (CP-OFDM), NR V2X may use the existing 7.5 kHz shift for aligning adjacent channels with SCS by integer multiples. The 7.5 kHz shift may be transmitted to the V2X device through an RRC signal. The RRC signal may include a frequencyShift7p5 kHz parameter.

Proposal 3. When LTE uplink/sidelink and NR sidelink coexist in the same band, the existing 7.5 kHz shift may be reused. To this, the network may transmit an RRC signal including a frequencyShift7p5 kHz parameter.

Also, for the n47 band, 10 MHz, 20 MHz, or 40 MHz may be used as the channel bandwidth.

In order to support all applicable channel bandwidths in n47, it may be advantageous to use 5 MHz units for the channel raster.

Proposal 5. This specification proposes to set the channel raster in units of 5 MHz in order to support a channel bandwidth of 10 MHz, 20 MHz, or 40 MHz.

Reviewing the criteria of Proposition 4, the channel raster number may be dependent on used SCS. In NR V2X, it can be considered that SCS of 15, 30, 60 kHz is used. Considering reducing the channel raster based on SCS rather than applicable the largest SCS, the actual impact due to leakage to adjacent channels may be greater than impact in the situation of using different numerologies between adjacent carriers. Therefore, an SCS of 60 kHz may be considered when designing n47 channel raster.

Meanwhile, in order to mitigate interference between adjacent subcarriers, a 300 kHz channel raster may be considered.

Therefore, it is proposed to reduce the channel raster as shown in the table below based on proposals 4 and 5 for 60 kHz and 300 kHz.

The table below shows the channel raster using 60 kHz and 300 kHz.

TABLE 11

| | Channel raster based on 60 kHz | | | Channel raster based on 300 kHz | | |
|---|---|---|---|---|---|---|
| Frequency [MHz] | Frequency [MHz] | NR-ARFCN | $\Delta$freq. [kHz] | Frequency [MHz] | NR-ARFCN | $\Delta$freq. [kHz] |
| 58601 | 5860.02 | 790668 | 20 | 5859.9 | 790660 | −100 |
| 58652 | 5865 | 791000 | 0 | 5865 | 791000 | 0 |
| 58701 | 5869.98 | 791332 | −20 | 5870.1 | 791340 | 100 |
| 58753 | 5875.02 | 791668 | 20 | 5874.9 | 791660 | −100 |
| 58801 | 5880 | 792000 | 0 | 5880 | 792000 | 0 |
| 58853 | 5884.98 | 792332 | −20 | 5885.1 | 792340 | 100 |
| 58901 | 5890.02 | 792668 | 20 | 5889.9 | 792660 | −100 |
| 58953 | 5895 | 793000 | 0 | 5895 | 793000 | 0 |
| 59001 | 5899.98 | 793332 | −20 | 5900.1 | 793340 | 100 |
| 59053 | 5905.02 | 793668 | 20 | 5904.9 | 793660 | −100 |
| 59101 | 5910 | 794000 | 0 | 5910 | 794000 | 0 |
| 59152 | 5914.98 | 794332 | −20 | 5915.1 | 794340 | 100 |
| 59201 | 5920.02 | 794668 | 20 | 5919.9 | 794660 | −100 |

Note 1.
Applicable to 10 MHz channel bandwidth (CBW)
Note 2.
Applicable to 20 MHz channel bandwidth (CBW)
Note 3.
Applicable to 20/40 MHz channel bandwidth (CBW)

A description of the channel arrangement for n47 is as follows.

Before we begin our discussion of channel raster, we need to consider the regulation in the human body.

Figure 9:
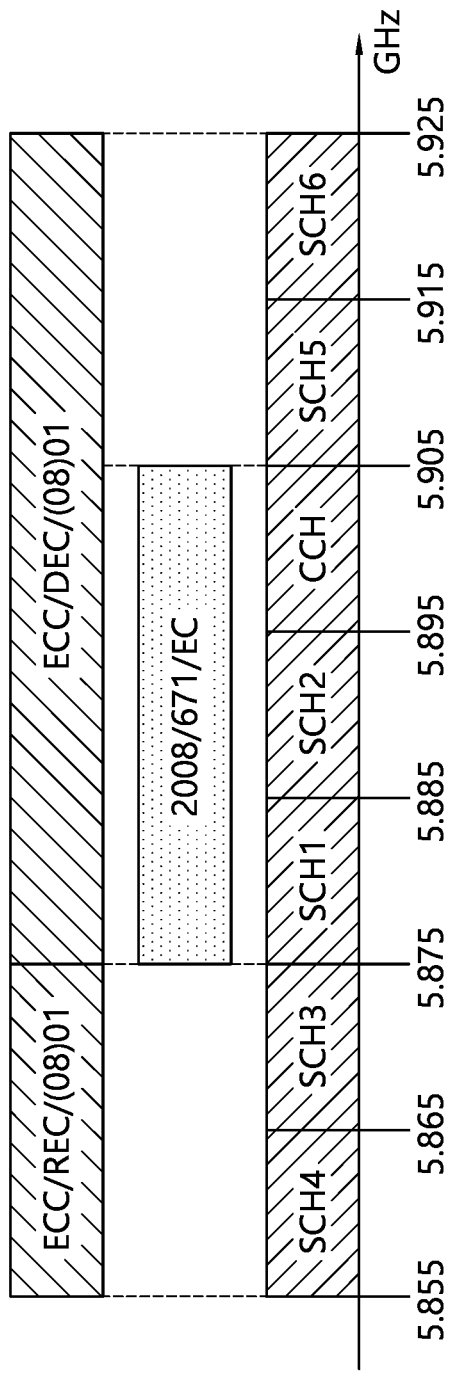
FIG. 9 shows an example of using the 5.9 GHz frequency band.

FIG. 9 shows an example of using the 5.9 GHz frequency band.

Referring to FIG. 9, a channel arrangement based on an ECC (Electronic Communications Committee) recommendation for an ITS (Intelligent Transport Systems) in a 5.9 GHz band is shown.

Considering the channel arrangement by the existing regulation at 5.9 GHz, instead of using the full range of NR-ARFCN, a channel raster with a reduced range in the n47 band may be used.

Proposal 4. This specification proposes to use a reduced channel arrangement based on the 10 MHz channel arrangement.

Reviewing the table above, when a 300 kHz raster is used for the n47 band, when comparing to the center frequency based on the channel layout to be applied regulation, a frequency shift of up to 100 kHz may be used, whereas 20 kHz frequency shift may be used for channel raster based on 60 kHz SCS. The guard band may be reduced up to 100 kHz. This may affect the use of NR V2X frequency. Therefore, the use of a channel raster based 60 kHz SCS may be more suitable. For SCS-based channel raster, an additional frequency shift of [−5 kHz, +5 kHz] may be required. 100 kHz channel raster in LTE may require a 7.5 kHz raster shift due to waveform differences. Since Proposal 2 proposes the use of a 7.5 kHz frequency shift, the additional frequency shift of [−5 kHz, 5 kHz] may be easily covered.

Proposal 6. The 60 kHz channel raster step size needs to be considered through signaling for an additional frequency shift of [−5 kHz, 5 kHz].

Considering these factors, it is proposed to use the NR-ARFCN indicated in bold in Table 12 above as n47 channel raster.

Proposal 7. It is proposed to use the following NR-ARFCN for n47 channel raster.

TABLE 12

| | Channel raster based on 60 kHz | | |
|---|---|---|---|
| Frequency [MHz] | Frequency [MHz] | NR-ARFCN | Δfreq. [kHz] |
| 58601 | 5860.02 | 790668 | 20 |
| 58652 | 5865 | 791000 | 0 |
| 58701 | 5869.98 | 791332 | −20 |
| 58753 | 5875.02 | 791668 | 20 |
| 58801 | 5880 | 792000 | 0 |
| 58853 | 5884.98 | 792332 | −20 |
| 58901 | 5890.02 | 792668 | 20 |
| 58953 | 5895 | 793000 | 0 |
| 59001 | 5899.98 | 793332 | −20 |
| 59053 | 5905.02 | 793668 | 20 |
| 59101 | 5910 | 794000 | 0 |
| 59152 | 5914.98 | 794332 | −20 |
| 59201 | 5920.02 | 794668 | 20 |

Figure 10:
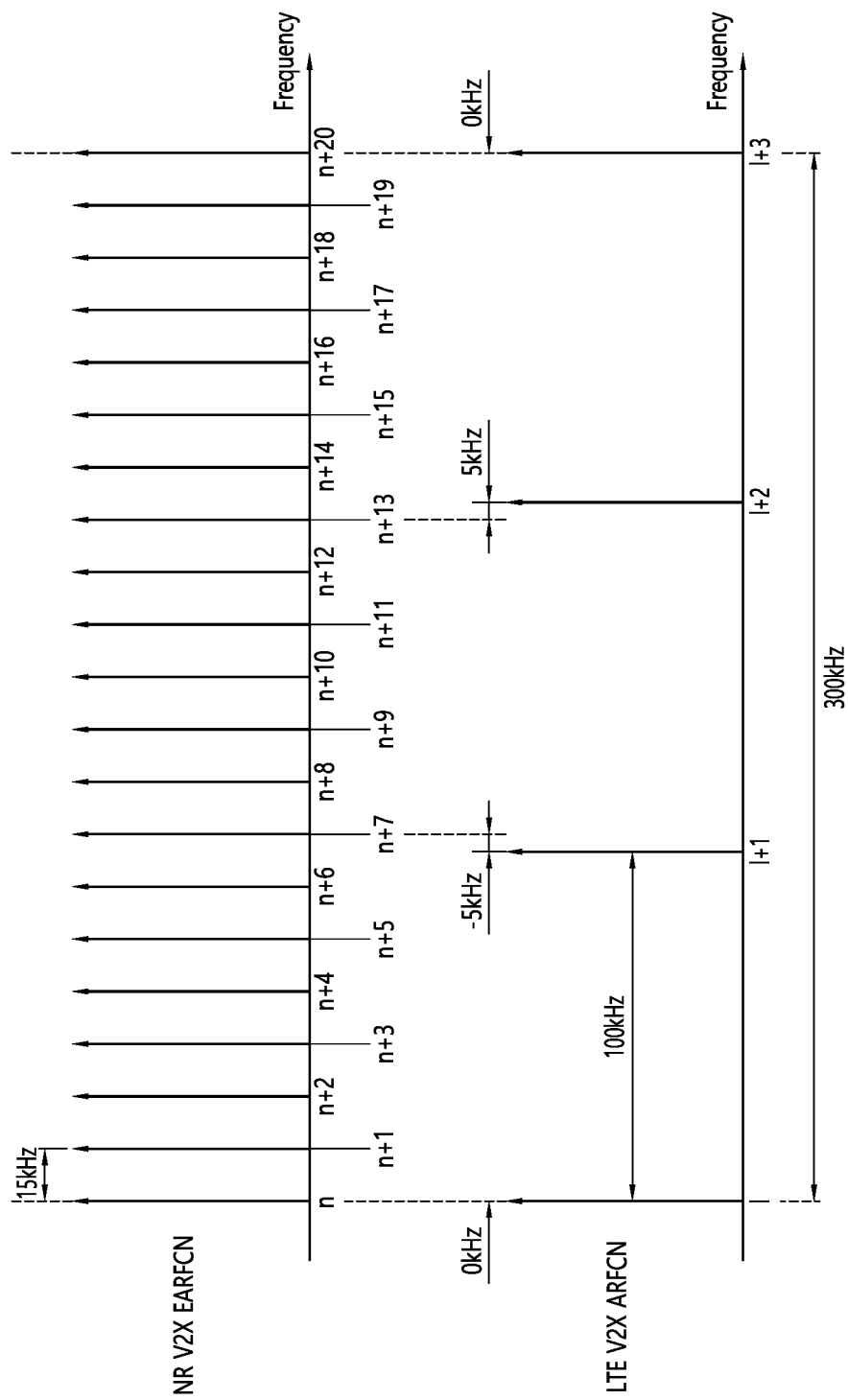
FIG. 10 is an exemplary diagram illustrating a channel raster for NR V2X according to the disclosure of this specification compared to a channel raster for LTE V2X.

FIG. 10 is an exemplary diagram illustrating a channel raster for NR V2X according to the disclosure of this specification compared to a channel raster for LTE V2X.

Referring to FIG. 10, a 15 kHz channel raster may be used in NR V2X, and a 100 kHz channel raster may be used in LTE V2X. Accordingly, there is a problem that the same section is repeated every 300 kHz.

In the case of NR-based Uu communication (ie, communication between a terminal and a base station), the above problem has been solved as follows. Specifically, when NR-based communication and LTE-based communication coexist in the same band, the above problem is solved by adjusting the channel raster of the NR-based communication to 100 kHz same with the channel raster of the LTE-based channel raster.

However, in the case of V2X communication, the situation is different.

That is, NR-based V2X communication uses a 15 kHz channel raster unlike LTE-based V2X communication. Therefore, when LTE-based V2X communication exists in an adjacent band, when NR-based V2X communication is used, the subcarrier used in LTE-based V2X communication and the subcarrier used in NR-based V2X communication are not integer multiples of 15 kHz. Therefore, there is coexistence problems in adjacent band.

In order to solve this, one disclosure of the present specification is to maintain an integer multiple of 15 kHz between adjacent subcarriers by shifting the center frequency of NR-based V2X communication by −5/0/5 kHz when LTE-based V2X communication exists nearby.

To this end, the network (i.e the base station) may transmit signaling for an additional frequency shift of −5/0/5 kHz to the V2X device.

The signal may be applied not only to n47 where LTE V2X is defined, but also to a band used by NR V2X.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 11:
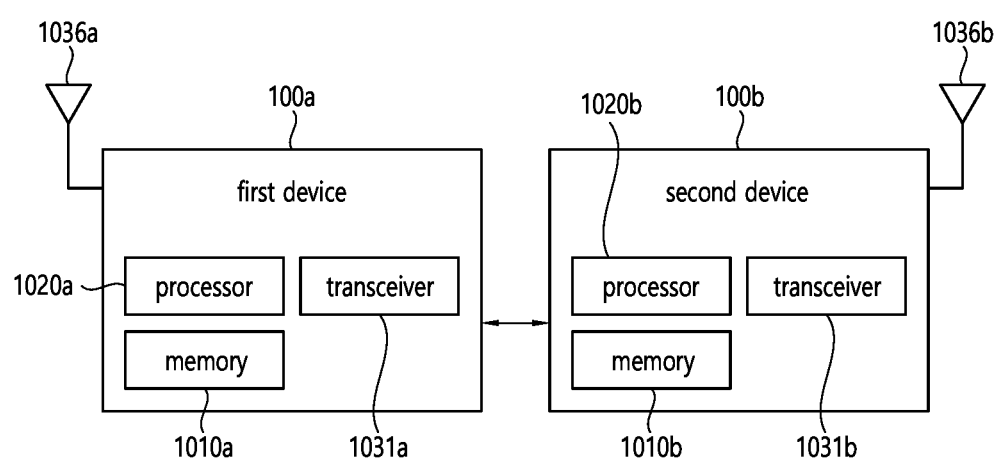
FIG. 11 shows an apparatus according to an embodiment.

FIG. 11 shows an apparatus according to an embodiment.

Referring to FIG. 11, a wireless communication system may include a first device (100a) and a second device (100b).

The first device (100a) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 12:
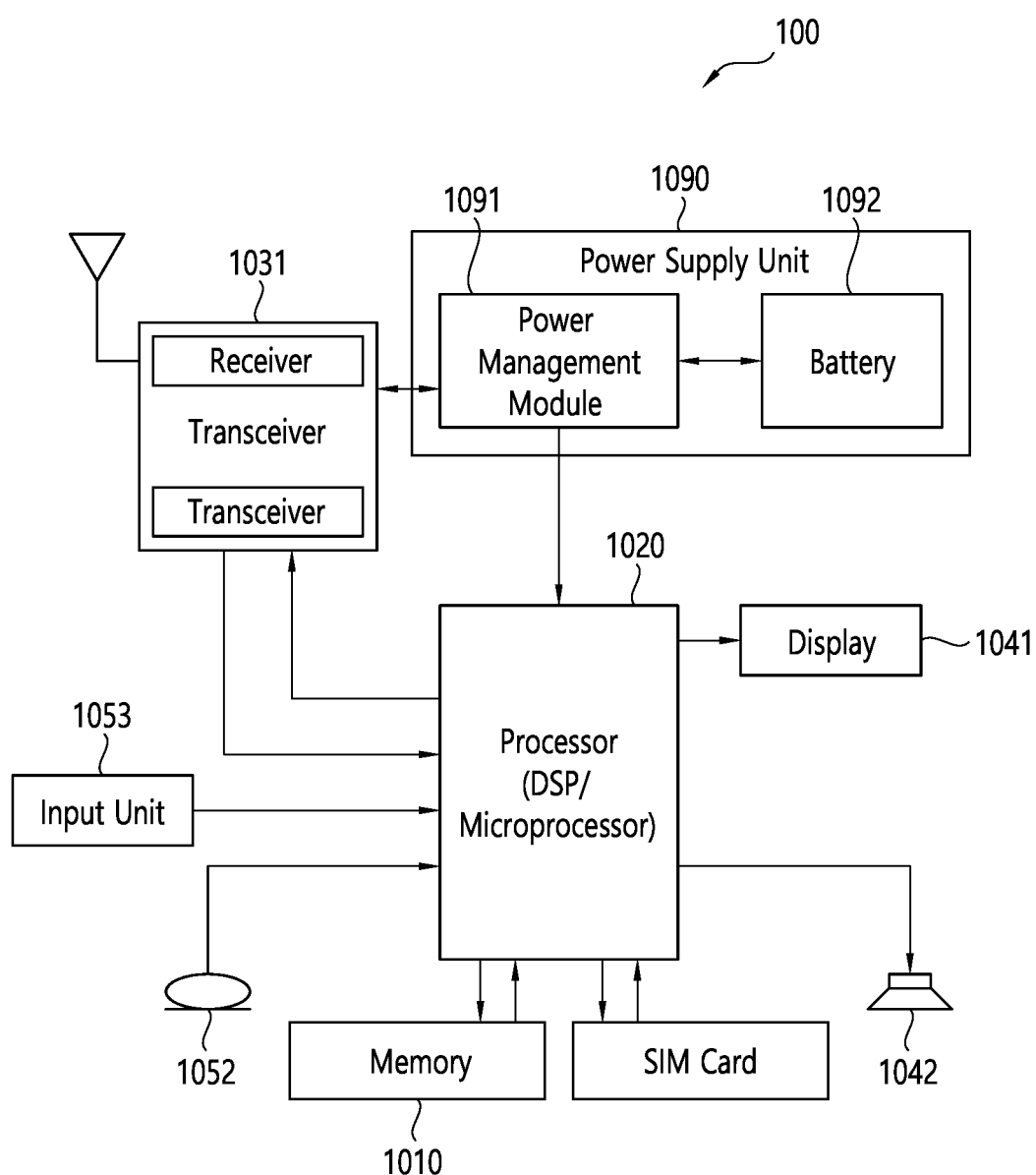
FIG. 12 is a block diagram illustrating the configuration of a terminal according to an embodiment.

FIG. 12 is a block diagram illustrating the configuration of a terminal according to an embodiment.

In particular, FIG. 12 is a diagram illustrating the apparatus of FIG. 12 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input unit (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 13:
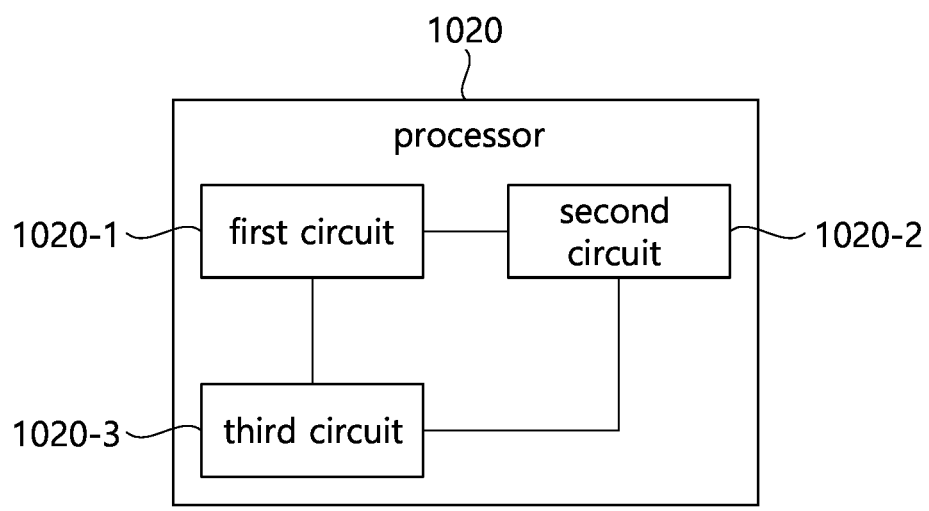
FIG. 13 shows a block diagram of a processor in which the disclosure of the present specification is implemented.

FIG. 13 shows a block diagram of a processor in which the disclosure of the present specification is implemented.

As can be seen with reference to FIG. 13, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The processor 1020 may be mounted on a V2X device or a base station.

First, an example in which the processor 1020 is mounted on the V2X device will be described.

The first circuit (1020-1) may determine at least one frequency position for at least one synchronization signal block (SSB), Position of the at least one frequency may be determined based on a channel raster for new radio (NR) V2X, The channel raster for the NR V2X may be determined based on a first frequency shift of −5 kHz or 5 kHz.

The second circuit (1020-2) may receive configuration information for the first frequency shift.

The channel raster NR V2X may be determined by a second frequency shift of 7.5 kHz.

The third circuit (1020-3) may receive configuration information for the second frequency shift.

The NR V2X communication may be performed in NR band n47.

The NR band n47 may include frequency range from 5855 MHz to 5925 MHz.

The fourth circuit (not shown) may receive the SSB in the determined frequency position.

Next, an example in which the processor 1020 is mounted on the base station will be described.

The first circuit (1020-1) may determine at least one frequency position for at least one synchronization signal block (SSB), Position of the at least one frequency may be determined based on a channel raster for new radio (NR) V2X, The channel raster for the NR V2X may be determined based on a first frequency shift of −5 kHz or 5 kHz.

The processor 1020 may be referred to as an application-specific integrated circuit (ASIC) or an application processor (AP), and may include at least one of a digital signal processor (DSP), a central processing unit (CPU), and a graphics processing unit (GPU).

Figure 14:
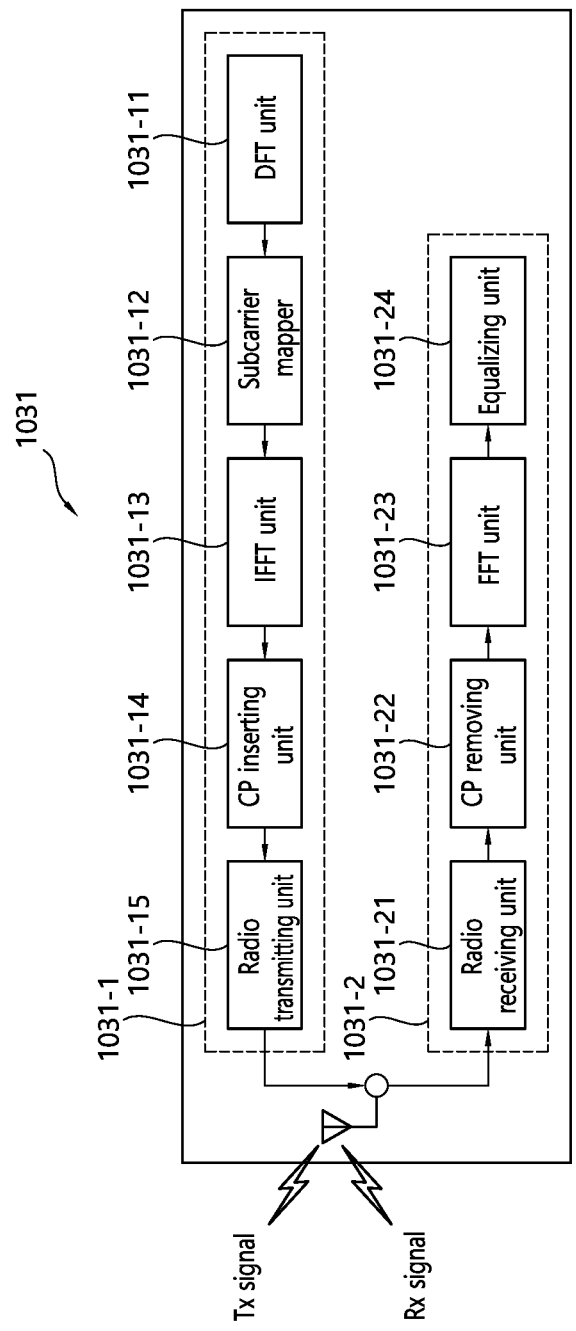
FIG. 14 is a detailed block diagram illustrating the transceiver of the first device shown in FIG. 12 or the transceiver of the device shown in FIG. 12 in detail.

FIG. 14 is a detailed block diagram illustrating the transceiver of the first device shown in FIG. 12 or the transceiver of the device shown in FIG. 12 in detail.

Referring to FIG. 14, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), It performs the reverse function of the CP insertion unit (1031-14) and the IFF unit (1031-13). The receiver (1031-2) may further include a demodulator.

V. Examples to which the Disclosure of the Present Specification can be Applied Although not limited thereto, the various descriptions, functions, procedures, suggestions, methods, and/or flow charts of the disclosure of the present specification disclosed may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 15:
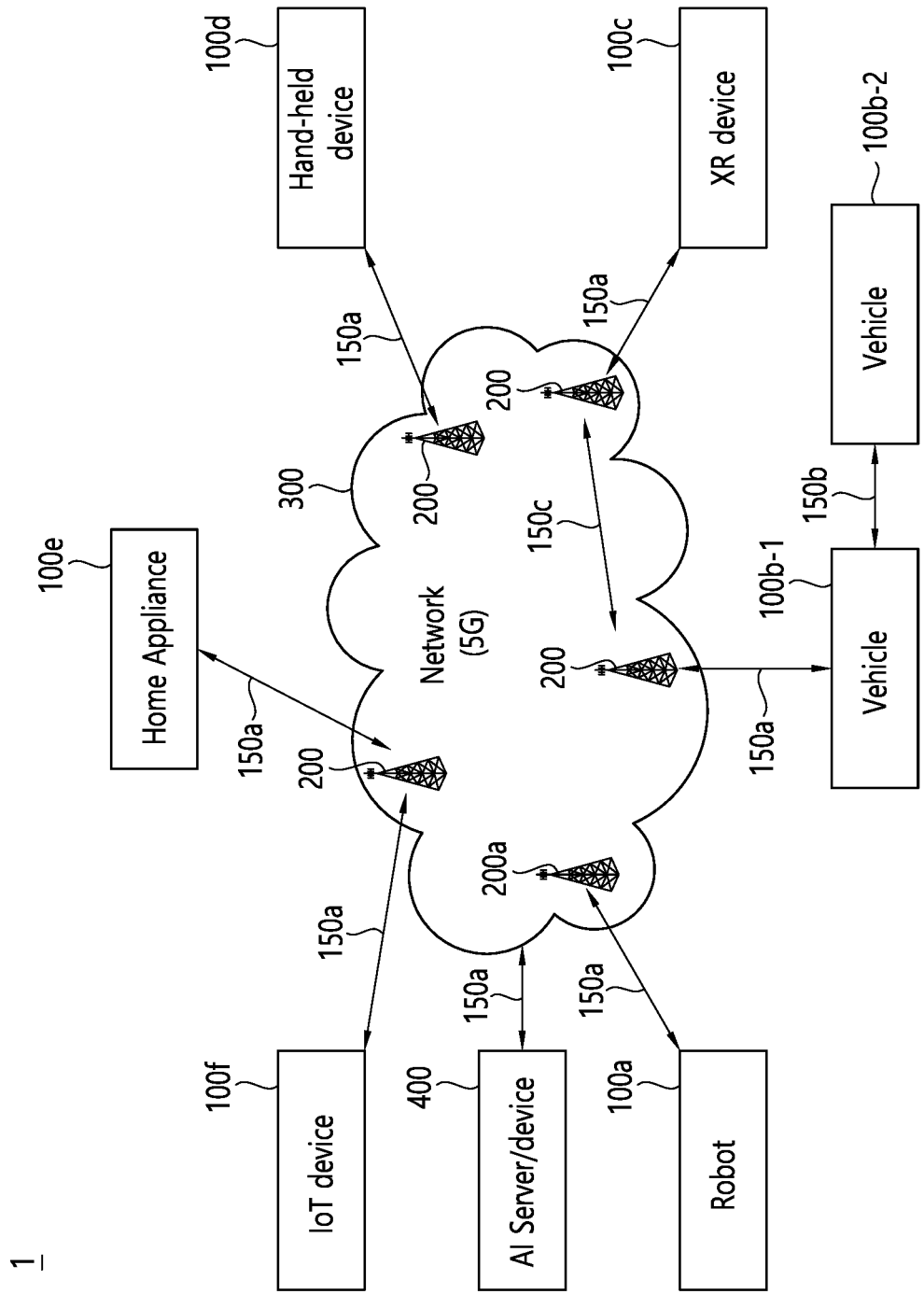
FIG. 15 illustrates a communication system 1 applied to the disclosure of the present specification.

FIG. 15 illustrates a communication system 1 applied to the disclosure of the present specification.

Referring to FIG. 15, a communication system (1) applied to the disclosure of the present specification includes a wireless device, a base station, and a network. Here, the wireless device may mean a device that performs communication using a wireless access technology (eg, 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d, and a home appliance (100e), an IoT (Internet of Thing) device (1001), and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (eg, a drone). XR devices include AR (Augmented Reality)/VR (Virtual Reality)/MR (Mixed Reality) devices, and include an HMD (Head-Mounted Device), a HUD (Head-Up Display) provided in a vehicle, a television, a smartphone, it may be implemented in the form of a computer, a wearable device, a home appliance, a digital signage, a vehicle, a robot, and the like. The portable device may include a smart phone, a smart pad, a wearable device (eg, a smart watch, smart glasses), a computer (eg, a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

The wireless devices (100a-100f) may be connected to the network (300) through the base station (200). AI (Artificial Intelligence) technology may be applied to the wireless devices (100a-100f), and the wireless devices (100a-100f) may be connected to the AI server (400) through the network (300). The network (300) may be configured using a 3G network, a 4G (e.g., LTE) network, or a 5G (e.g., NR) network. The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (e.g, sensor) may directly communicate with other IoT devices (e.g, sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (e.g, relay, IAB (Integrated Access Backhaul)). This can be done through technology (e.g, 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, at least some of various configuration information setting process for transmission/reception of a wireless signal (eg, channel encoding/decoding, modulation/demodulation, resource mapping/demapping, etc.), resource allocation process and etc may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for a vehicle to everything (V2X) communication, comprising:
   determining a first reference frequency for a channel raster for new radio (NR) V2X based on a first frequency shift of −5 kHz or 5 kHz from a second reference frequency for a channel raster for NR;
   wherein the second reference frequency for the channel raster for NR is determined based on an NR Absolute Ratio Frequency Channel Number (NR-ARFCN),
   wherein a range of the NR-ARFCN is from 0 to 2016666, and
   determining a position of at least one frequency for at least one synchronization signal block (SSB), based on the first reference frequency for the channel raster for NR V2X.

2. The method of claim 1, further comprising:
   receiving configuration information for the first frequency shift.

3. The method of claim 1, further comprising:
   determining the first reference frequency for a channel raster for NR V2X, based on a second frequency shift of 7.5 kHz from the second reference frequency for the channel raster for NR.

4. The method of claim 3, further comprising:
   receiving configuration information for the second frequency shift.

5. The method of claim 1,
   wherein communication for the NR V2X is performed in NR band n47.

6. The method of claim 5,
   wherein the NR band n47 includes frequency range from 5855 MHz to 5925 MHz.

7. The method of claim 1, further comprising:
   receiving the at least one SSB in the position of the at least one frequency.

8. A V2X (VEHICLE-TO-EVERYTHING) communication device, comprising:
   at least one processor; and
   at least one memory for storing instructions and operably electrically connectable with the at least one processor,
   wherein, based on being executed by the at least one processor, the instructions perform operation comprising:
   determining a first reference frequency for a channel raster for new radio (NR) V2X based on a first frequency shift of −5 kHz or 5 kHz from a second reference frequency for a channel raster for NR;
   wherein the second reference frequency for the channel raster for NR is determined based on an NR Absolute Ratio Frequency Channel Number (NR-ARFCN),
   wherein a range of the NR-ARFCN is from 0 to 2016666, and
   determining a position of at least one frequency for at least one synchronization signal block (SSB), based on the first reference frequency for the channel raster for NR V2X.

9. The device of claim 8, wherein the operation further comprises:
   receiving configuration information for the first frequency shift.

10. The device of claim 8, wherein the operation further comprises:
    determining the first reference frequency for a channel raster for NR V2X based on a second frequency shift of 7.5 kHz from the second reference frequency for a channel raster for NR.

11. The device of claim 10, wherein the operation further comprises:
    receiving configuration information for the second frequency shift.

12. The device of claim 8,
    wherein communication for the NR V2X is performed in NR band n47.

13. The device of claim 12,
    wherein the NR band n47 includes frequency range from 5855 MHz to 5925 MHz.

14. The device of claim 8, wherein the operation further comprises:
    receiving the at least one SSB in the position of the at least one frequency.

15. A chipset installed in a V2X (vehicle to everything) communication device, comprising:
    at least one processor;
    at least one memory for storing instructions and operably electrically connectable with the at least one processor, wherein the instructions, based on being executed by the at least one processor, perform operation comprising:
    determining a first reference frequency for a channel raster for new radio (NR) V2X based on a first frequency shift of −5 kHz or 5 kHz from a second reference frequency for a channel raster for NR;
    wherein the second reference frequency for the channel raster for NR is determined based on an NR Absolute Ratio Frequency Channel Number (NR-ARFCN),
    wherein a range of the NR-ARFCN is from 0 to 2016666, and
    determining a position of at least one frequency for at least one synchronization signal block (SSB), based on the first reference frequency for the channel raster for NR V2X.

* * * * *